(12) United States Patent
Yamamoto et al.

(10) Patent No.: US 7,913,493 B2
(45) Date of Patent: Mar. 29, 2011

(54) ROTARY DISPLACEMENT STEAM ENGINE

(75) Inventors: Yasushi Yamamoto, Kanagawa (JP); Tomohisa Sako, Kanagawa (JP); Makoto Abe, Kanagawa (JP)

(73) Assignee: Isuzu Motors Limited, Tokyo (JP)

( * ) Notice: Subject to any disclaimer, the term of this patent is extended or adjusted under 35 U.S.C. 154(b) by 426 days.

(21) Appl. No.: 11/989,837

(22) PCT Filed: Aug. 29, 2006

(86) PCT No.: PCT/JP2006/317398
§ 371 (c)(1),
(2), (4) Date: Feb. 1, 2008

(87) PCT Pub. No.: WO2007/026909
PCT Pub. Date: Mar. 8, 2007

(65) Prior Publication Data
US 2010/0154420 A1 Jun. 24, 2010

(30) Foreign Application Priority Data
Aug. 31, 2005 (JP) ................................. 2005-251404

(51) Int. Cl.
*F03B 17/02* (2006.01)
*F01K 11/00* (2006.01)
(52) U.S. Cl. .......................................... 60/496; 60/669
(58) Field of Classification Search .................. 60/496, 60/516–526, 645–676
See application file for complete search history.

(56) References Cited

U.S. PATENT DOCUMENTS

| 144,883 | A | * | 11/1873 | Beekman | 60/496 |
| 196,038 | A | * | 10/1877 | Partz | 60/496 |
| 3,080,722 | A | * | 3/1963 | Molnar | 60/669 |
| 4,399,657 | A | * | 8/1983 | Berry | 60/664 |
| 5,027,602 | A | * | 7/1991 | Glen et al. | 60/651 |
| 5,488,828 | A | * | 2/1996 | Brossard | 60/675 |
| 6,434,942 | B1 | * | 8/2002 | Charlton | 60/641.11 |

FOREIGN PATENT DOCUMENTS

DE   37 18551 A1   12/1988
(Continued)

OTHER PUBLICATIONS

Japanese Office Action dated Oct. 5, 2010.

*Primary Examiner* — Thomas E Denion
*Assistant Examiner* — Christopher Jetton
(74) *Attorney, Agent, or Firm* — McGinn IP Law Group, PLLC

(57) ABSTRACT

A steam engine of a simple constitution capable of efficiently obtaining mechanical energy not only from a heat source of a high temperature but also from various heat sources in a low-temperature state such as the exhaust heat of an internal combustion engine. The engine comprises a displacement engine 1 having a rotor 13 that rotates, a steam-generating portion 2 arranged thereunder and a condenser 3 arranged thereover. Water heated in the steam-generating portion 2 becomes the steam which is fed into the displacement engine 1, enters into an operation chamber that moves up, rotates the rotor 13 and is, thereafter, fed into the condenser 3 where it is condensed to turn into the condensate. The condensate falls on the rotor 13 on the lower side due to gravity, and is refluxed into the steam-generating portion 2 through the operation chamber that moves downward with rotation of the rotor 13. The steam engine efficiently operates even at low speeds, requires no pump for refluxing the condensate, and is constituted in a compact size.

9 Claims, 6 Drawing Sheets

FOREIGN PATENT DOCUMENTS

| | | |
|---|---|---|
| JP | 61-210201 | 9/1986 |
| JP | 61-232387 | 10/1986 |
| JP | 61-255202 | 11/1986 |
| JP | 62-60638 | 12/1987 |
| JP | 3-51663 | 11/1991 |
| JP | 2001-20706 | 1/2001 |

* cited by examiner

ROTARY DISPLACEMENT STEAM ENGINE

FIELD OF THE INVENTION

This invention relates to a steam engine for converting thermal energy into mechanical energy such as rotational energy and, more particularly, to a steam engine of a simple constitution for efficiently generating the mechanical energy from a heat source of relatively low temperature.

BACKGROUND ART

In recent years, technologies have been developed for utilizing a variety of energy resources from the viewpoint of the environmental measure, saving resources and saving energy. Among them is a technology for taking out the mechanical energy from the thermal energy present in the natural world, such as solar heat. Technologies have also been developed to improve the thermal efficiency of an internal combustion engine by recovering the power which is generated by utilizing the exhaust heat into the exhaust gas or into the cooling water of an internal combustion engine such as diesel engine, and the like.

Heat engines are used for converting the thermal energy into the mechanical energy such as rotational energy. The heat engines include internal combustion engines that use the air elevated to a high temperature and a high pressure by the combustion directly as the operation fluid and external combustion engines that produce the operation fluid of a high temperature and a high pressure by the conduction of heat. It is not allowed to use the internal combustion engine for converting the heat energy in the natural world or the thermal energy of the internal combustion engine into the mechanical energy. Therefore, the steam engine which is an external combustion engine is much used. Usually, the steam engine is equipped with a steam generator such as a boiler for generating the steam by using the heat of a heat source, an expansion machine such as a steam turbine for generating the power, a condenser for condensing the expanded steam and a condensate pump for refluxing the condensate into the steam generator. Therefore, the constitution is complex and is large in scale.

The internal combustion engine or the external combustion engine that uses an ordinary fuel such as petroleum, natural gas or the like, is the one in which the fuel is burned to produce an operation fluid of a high temperature and a high pressure and the thermal energy is converted into the mechanical energy, and features a high thermal efficiency since the mechanical energy is taken out from the heat source in the state of a high temperature. However, the thermal energy in the natural world and the exhaust heat of the internal combustion engine are, usually, the thermal energies which do not have so high temperature, i.e., which are in a low-temperature state. In order to efficiently take out the mechanical energy from such heat sources, therefore, it becomes necessary to use a heat engine adapted to the heat source in a low-temperature state.

The engine disclosed in JP-A-2001-20706 is a heat engine which is relatively simply constituted for generating the mechanical energy from the heat source in a low-temperature state. As shown in FIG. 6, this engine comprises a steam-generating portion 101 and a cooling portion 102 which are coupled together through nozzles 103. A turbine 106 is arranged in the cooling portion 102 at a position facing the nozzles 103, and rotates together with magnets 107. On the inside of the magnets 107, a stationary generating coil 110 is arranged facing thereto, and the magnets 107 and the generating coil 110 together constitute a generating device. The steam-generating portion 101 and the cooling portion 102 are sealed, respectively. Water 104 which is an operation fluid is filled therein, and the air inside is evacuated by a vacuum pump. Many heat pipes 105 for heat radiation are mounted on the upper side of the cooling portion 102.

The steam-generating portion 101 and the cooling portion 102 as a whole constitute a heat pipe, and water 104, which are heated up in the steam-generating portion 101 from the lower side thereof and become steam, create a high-speed stream which is jetted to the blades of the turbine 106 from the nozzles 103. Accordingly, the turbine 106 and the magnets 107 rotate to produce the rotational energy which is, finally, converted into the electric energy by the magnets 107 and the generating coil 110, and is output to an external unit. The steam after having driven the turbine 106 is cooled down with the heat-radiating action of the heat pipes 105 and returns back to water. The condensate falls down to the lower side of the cooling portion 102 due to gravity, and is refluxed into the steam-generating portion 101 through the central portion.

The heat pipe that utilizes vaporization and condensation of liquid contained in the sealed container is, usually, used as a heat conveying means, i.e., as a heat transfer device. Here, the steam of liquid contained in the heat pipe moves accompanying large velocity energy and, therefore, the power can be taken out therefrom as described above. In this case, the mechanical energy can be taken out from the heat source in a low-temperature state.

The turbine disclosed in the above JP-A-2001-20706 is a so-called velocity type engine which utilizes the velocity energy of the operation fluid. To efficiently operate the turbine, the rotational speed of the turbine must be increased so that the circumferential velocity thereof is increased to match the velocity of the steam. However, when decreasing the diameter of the turbine to miniaturize it, the rotational speed of the turbine becomes very high and a large centrifugal force acts on the turbine and may break it down. To drive the load by using an engine which revolves at high speeds, further, it becomes necessary to provide a reduction gear to lower the rotational speed. When it is attempted to take out the power in the form of electric energy by a generator, a peripheral control unit and the like being necessary for the high speed generator are complex and expensive.

In the turbine device as disclosed in the above publication, nozzles are arranged in the inlet of the turbine in an attempt to increase the velocity energy of the steam which is the operation fluid. Therefore, the distance becomes relatively long between the heating portion and the turbine, and the steam is cooled therebetween resulting in a loss of heat. Further, when the temperature of the heating portion is low and the steam is of a low temperature, the steam is superheated to only a low degree, and water droplets tend to form due to the cooling. Water droplets that are formed come into collision with the turbine blades at high speed, and the turbine blades develop the so-called erosion due to the collision with water droplets.

When the heat engine is rotated being contained in a closed container, the rotary shaft must be supported by bearings having sealing performance. To support the rotary shaft that rotates at high speed such as of the turbine, precision bearings are necessary. Namely, complex and expensive bearings must be used to support the rotary shaft maintaining sealing performance requiring an increased cost for the maintenance.

The assignment of the present invention is to provide a heat engine capable of obtaining the mechanical energy not only from the heat sources of high temperatures but also from various heat sources in a low-temperature state, such as exhaust heat of an internal combustion engine while solving the above-mentioned problems inherent in the conventional heat engines.

DISCLOSURE OF THE INVENTION

In order to solve the above assignment, the steam engine of the present invention comprises a displacement engine having a rotor that rotates, a steam-generating portion arranged thereunder and a condenser arranged thereover, and wherein the operation fluid is transferred and refluxed through the displacement engine. That is, as described in claim 1, the present invention is concerned with a steam engine comprising a displacement engine having a rotor that rotates, a steam-generating portion arranged under the displacement engine being communicated with the displacement engine to generate the steam by heating the liquid contained therein, and a condenser arranged over the displacement engine being communicated with the displacement engine to condense the steam of the liquid, wherein the rotor is provided with a plurality of operation chambers; and the steam of the liquid generated in the steam-generating portion is fed into the operation chambers on the side that is moving upward with the rotation of the rotor, and the liquid condensed by the condenser is fed into the operation chambers on the side moving downward with the rotation of the rotor and is refluxed into the vapor-generating portion.

The thus constituted steam engine of the present invention comprises the steam-generating portion arranged on the lower side, a heat pipe structure similar to that of when a condenser is arranged on the upper side, and a displacement engine having a rotor that rotates arranged therebetween. The rotor is provided with a plurality of operation chambers. The steam of a high temperature and a high-pressure is fed into the operation chambers on the side that moves upward with the rotation of the rotor. Therefore, a rotational torque acts on the rotor and, therefore, the power can be taken out. The magnitude of rotational torque acting on the rotor is determined by the steam pressure irrespective of the rotational speed of the rotor. Therefore, a constant torque is obtained even when the rotor rotates at a low speed. Unlike the turbine that converts the velocity energy of steam into the rotational energy, the engine of the invention can be efficiently operated even at low speeds.

The steam in the operation chambers of the rotor expands with the rotation of the rotor. When the operation chamber arrives at a predetermined position, the steam is discharged into the condenser arranged on the upper side. The steam is cooled and condensed into the liquid which falls onto the upper surface of the rotor of the displacement engine due to gravity. The liquid staying on the upper surface of the rotor enters into the operation chamber on the side that moves down with the rotation of the rotor, i.e., enters into the operation chamber on the side where the volume decreases to form a confined portion. When the operation chamber arrives at a predetermined position, the liquid is refluxed into the steam-generating portion on the lower side. As described above, the liquid condensed in the condenser is forcibly transferred into the steam-generating portion by utilizing the rotation of the rotor in the displacement engine eliminating a condensate pump that is usually used in the steam engine and enabling the engine to be simply and compactly constituted.

The steam engine of the present invention requires no nozzle unlike the turbine and, therefore, the steam-generating portion can be arranged close to the displacement engine decreasing the heat loss correspondingly. Moreover, since the rotational speed is low, there is no need of employing precision bearings for high speeds for supporting the rotary shaft unlike the turbine. Besides, no erosion is caused by the collision with water droplets.

As described in claim 2, it is desired that a vacuum pump is connected to the condenser, and the pressure in the condenser is set to be a saturated steam pressure of the liquid. In this case, the steam that is generated can be expanded to a sufficient degree to increase the engine output and, at the same time, the pressure in the steam-generating portion can be lowered depending upon a decrease in the pressure on the condenser side. As a result, the liquid easily turns into the steam even when the temperature of the heating portion is not so high, and the engine is efficiently operated to take out the rotational energy.

In the steam engine of the present invention, the steam-generating portion, the displacement engine and the capacitor are arranged in the up-and-down direction in a state of being communicated with each other. It is, therefore, allowed to freely set the level of the liquid contained in the engine, i.e., to freely set the liquid level in a state where the engine is not in operation. When the level of the contained liquid is set in the condenser as described in claim 3, the inside of the condenser is filled with a mixture of the steam and the liquid while the steam engine is in operation, and the steam is cooled and condensed upon substantially coming in direct contact with the liquid. This promotes the transfer of heat, and the condenser can be realized in a small and compact size.

BEST MODE FOR CARRYING OUT THE INVENTION

Figure 1:
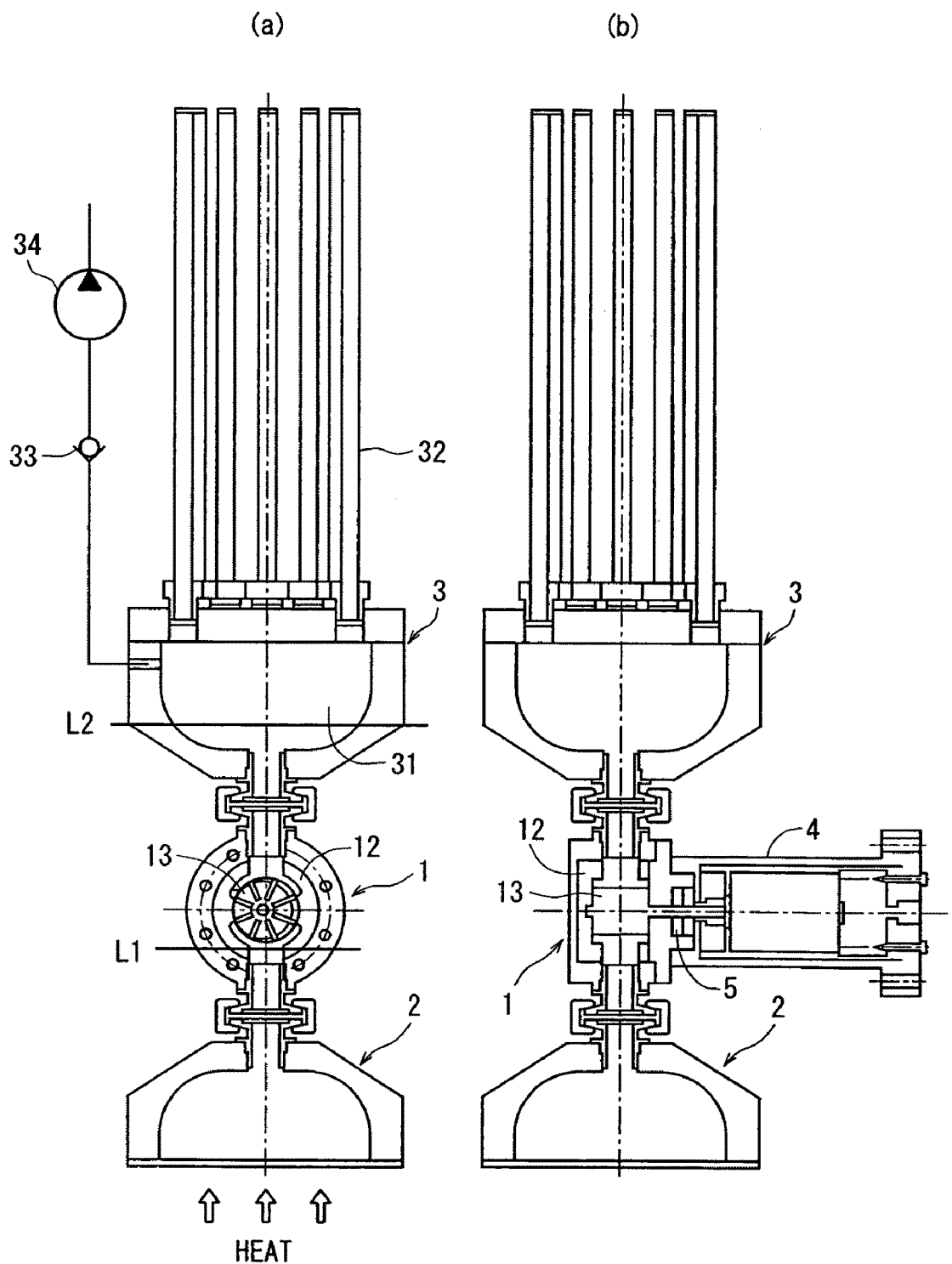
FIG. 1 is a sectional view of a steam engine of the present invention.
Figure 2:
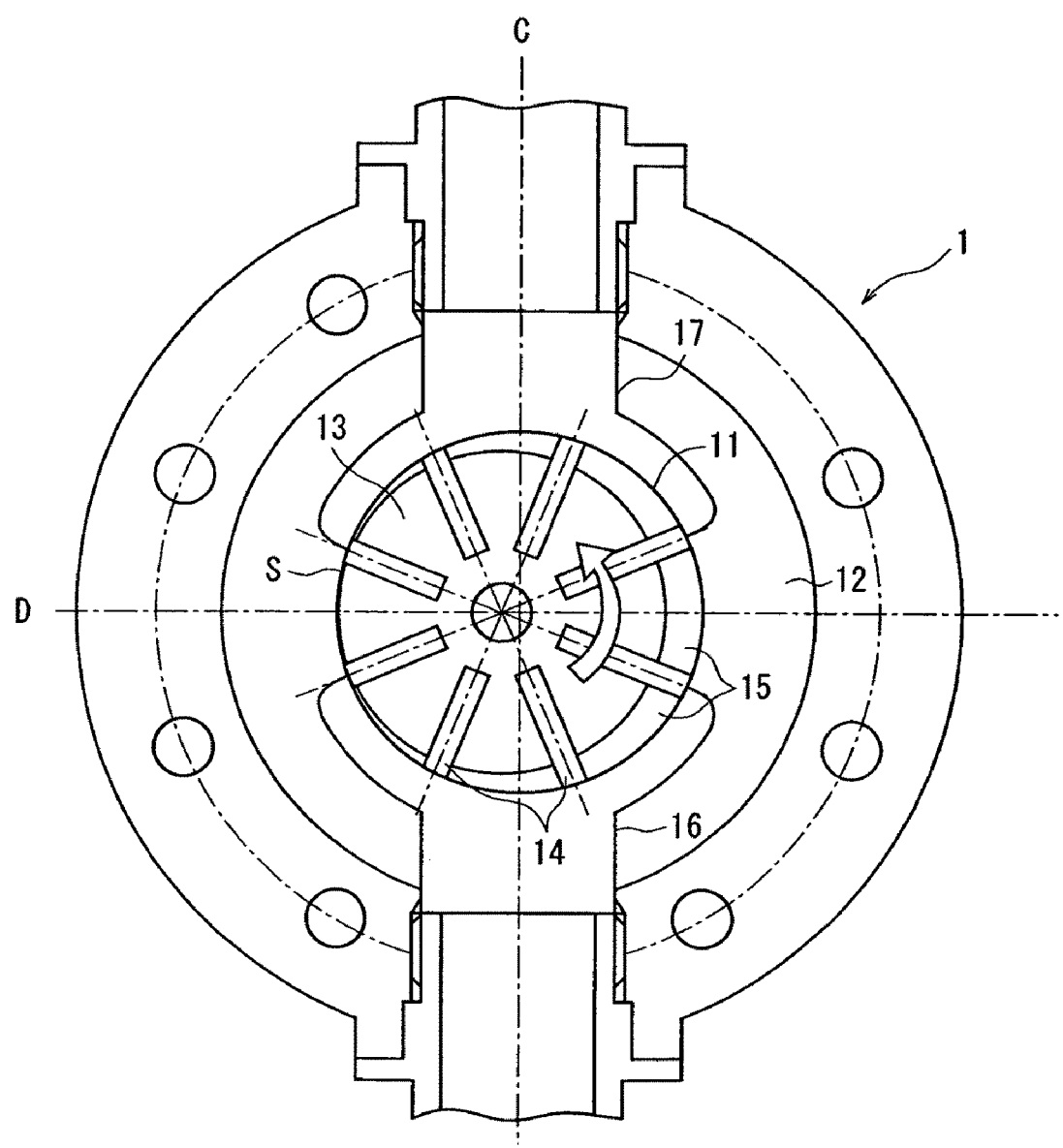
FIG. 2 is a sectional view illustrating, on an enlarged scale, a displacement engine in the steam engine of the present invention.

An embodiment of the invention will now be described in detail with reference to the drawings. FIG. 1 is a sectional view of a steam engine of the present invention, wherein (a) is a central sectional view of a rotor of the displacement engine at right angles with the rotary shaft, and (b) is a sectional view at right angles with (a) and the displacement engine portion includes the rotary shaft of the rotor. FIG. 2 is a sectional view illustrating, on an enlarged scale, the displacement engine.

The steam engine of the present invention comprises a displacement engine 1 for taking out the power, a steam-generating portion 2 arranged thereunder for generating the steam and a condenser 3 arranged thereover for cooling and condensing the steam. The displacement engine 1, the steam-generating portion 2 and the condenser 3 are connected together through short pipes for coupling and joints, and contain water as an operation fluid therein. When the engine is not in operation, the water contained therein fills the inside of the steam-generating portion 2, and the water level L1 is set to be just under the rotor of the displacement engine 1.

The lower surface of the steam-generating portion 2 is a heat transfer surface that is heated by an external heat source such as the exhaust heat of an internal combustion engine. Water heated here becomes the steam which is introduced into the displacement engine 1 through the upper short pipe. The condenser 3 is provided with a steam reservoir portion 31 of a circular shape in horizontal cross section. On the upper part of the steam reservoir portion 31, many pipes are circularly arranged and mounted being communicated with the steam reservoir portion 31 to cool and condense the steam by radiating the heat. The pipes 32 have their upper ends closed. Further, a vacuum pump 34 is connected, via a check valve 33, to the steam reservoir portion 31 of the condenser 3 to evacuate gases such as the air to thereby maintain a saturated steam pressure in the condenser 3.

In this embodiment as shown in FIG. 2, the displacement engine 1 is constituted as a vane-type machine having a constitution the same as a vane pump. Namely, the displacement engine 1 has a casing 12 forming a cavity portion 11 of a circular shape in cross section. A rotor 13 of a circular shape in cross section is disposed in the cavity portion 11 in a deviated manner. The rotor 13 is provided with a plurality of vanes 14 that are capable of moving in the radial direction. The vanes 14 rotate together with the rotor 13, and move outward in the radial direction due to centrifugal force, and the ends thereof come in contact with the circumferential wall of the cavity portion 11. Therefore, the displacement engine 1 forms operation chambers 15 surrounded by the adjacent vanes 14, outer surface of the rotor 13 and circumferential wall of the cavity portion 11.

A steam inlet portion 16 is formed in the lower part of the displacement engine 1 and a steam exit portion 17 is formed in the upper part thereof being communicated with the steam-generating portion 2 and with the condenser 3, respectively. The rotor 13 rotates in the direction of a white arrow in FIG. 2 due to the steam fed through the steam inlet portion 16. With the rotation, the operation chambers 15 on the right side of a vertical center axis C in FIG. 2 move upward and the operation chambers 15 on the left side thereof move downward. The volumetric capacity of the operation chamber 15 varies with the rotation of the rotor 13, i.e., increases on the lower side of a transverse center axis D and decreases on the upper side thereof. Further, the condensate condensed in the condenser 3 falls on the upper surface of the rotor 13 through the steam outlet portion 17 due to gravity.

Referring to FIG. 1(b), the deviated center shaft of the rotor 13 is rotatably supported at its both ends by the side wall of the casing 12 via bearings. The one side of the center shaft extends outward through the casing 12 and is coupled to the rotor of a generator 4. A shaft seal 5 is arranged at a portion where the center shaft is through the casing 12 in order to seal the steam or the water in the displacement engine 1. In this embodiment, the generator is driven. In order to convert the exhaust heat of an internal combustion engine into the rotational energy, the center shaft of the displacement engine 1 may be coupled to the output shaft of the internal combustion engine through a transmission device to assist the output.

Figure 3:
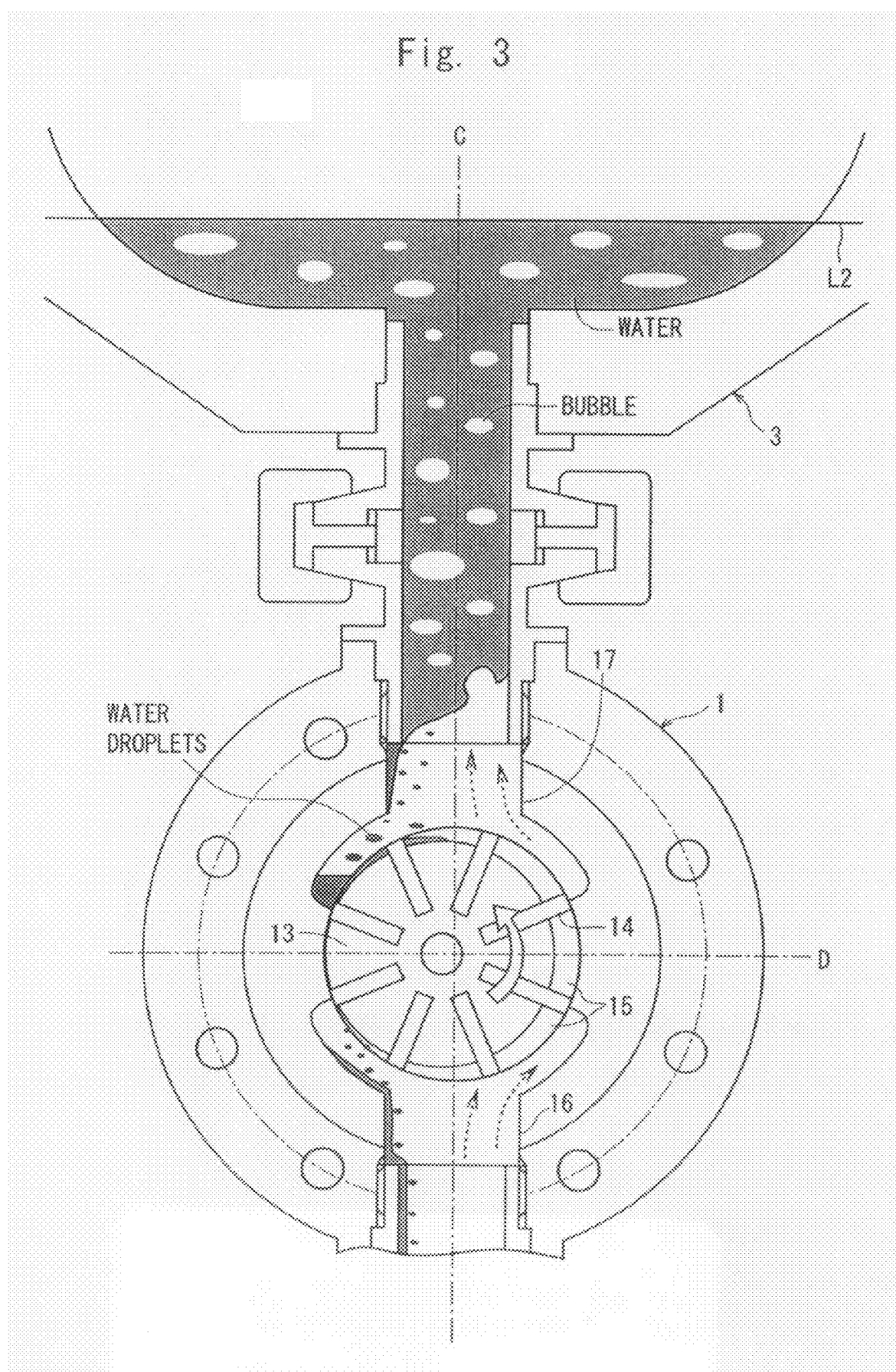
FIG. 3 is a view illustrating the operation of the steam engine of the present invention.

Next, the operation of the steam engine of the present invention will be described with reference to a view of operation of FIG. 3.

The lower surface of the steam-generating portion 2 of the steam engine containing water is heated by the exhaust heat of an internal combustion engine or a heat source such as solar heat. Water in the steam-generating portion 2 is boiled to be very swollen in the specific volume and become steam of a high pressure. The steam of the high pressure is fed into the displacement engine 1 as indicated by arrows of broken lines from the short pipe provided on the steam-generating portion 2.

When the steam engine is not in operation, the level L1 of water contained therein is just under the rotor 13 of the displacement engine 1 (see FIG. 1(a)). At the start of the steam engine, water is pushed up due to the steam that is generated, and the mixture of steam and water reaches the upper side of the rotor 13 while rotating the rotor 13, and is fed into the condenser 3. During the steady operation of the steam engine, the condensate that is formed by being cooled in the condenser forms a nearly constant liquid level L2 and through which the steam rises as bubbles so as to be cooled in the condenser 3.

During the steady operation of the steam engine, the steam of a high pressure fed into the displacement engine 1 through the short pipe fills the operation chamber 15 of which the volume gradually increases on the lower side of the transverse center line D. With the rotation of the rotor, the steam is fed into the operation chamber 15 on the side moving upward, i.e., is fed into the operation chamber 15 on the right side of the vertical center line C, and imparts a rotational torque to the deviated rotor 13 and to the vanes 14 based on a pressure differential between the side of the steam-generating device 2 and the side of the condenser 3. In this embodiment, the steam inlet portion 16 is opened over a wide range in the circumferential direction of the rotor 13. If the range in which the steam inlet portion 16 is opening is narrowed, then the operation chamber 15 becomes sealed after it has passed over the steam inlet portion 16 and, therefore, the steam expands in the operation chamber 15.

As the vane 14 passes over the opening of the steam exit portion with the rotation of the rotor 13, the steam in the operation chamber 15 moving upward is released into the space on the side of the condenser 3 in which the pressure has been lowered by using the vacuum pump 34. The condensate cooled and condensed in the condenser 3 is staying in a portion under the condenser 3 connected to the displacement engine 1, and the steam passes therethrough as bubbles and partly comes into direct contact with the condensate to turn into water. The remainder of the steam reaches beyond the liquid level L2, is sent into the pipes 32 and is condensed, and falls as the condensate on the liquid level L2.

The condensate staying in a portion under the condenser 3 connected to the displacement engine 1 falls as water droplets on the upper surface of the rotor 13, and is refluxed into the steam inlet portion 16 by the operation chamber 15 on the left side of the vertical center axis C, i.e., by the operation chamber 15 that moves downward with the rotation of the rotor 13. At this moment, the volume of the operation chamber 15 decreases and forms a confined portion S in which the volume becomes a minimum. Here, the surface of the rotor 13 may be provided with an elastic member which is capable of elastic deformation so that the rotor 13 and the like will not be damaged by the confined condensate that is the non-compressive fluid. The condensate refluxed into the steam inlet portion 16 descends down to the steam-generating portion 2 due to gravity, and is heated again to form the steam. The steam engine of the present invention repeats the above cycle of vaporization and condensation to convert the heat possessed by the heat source into the power.

Figure 4:
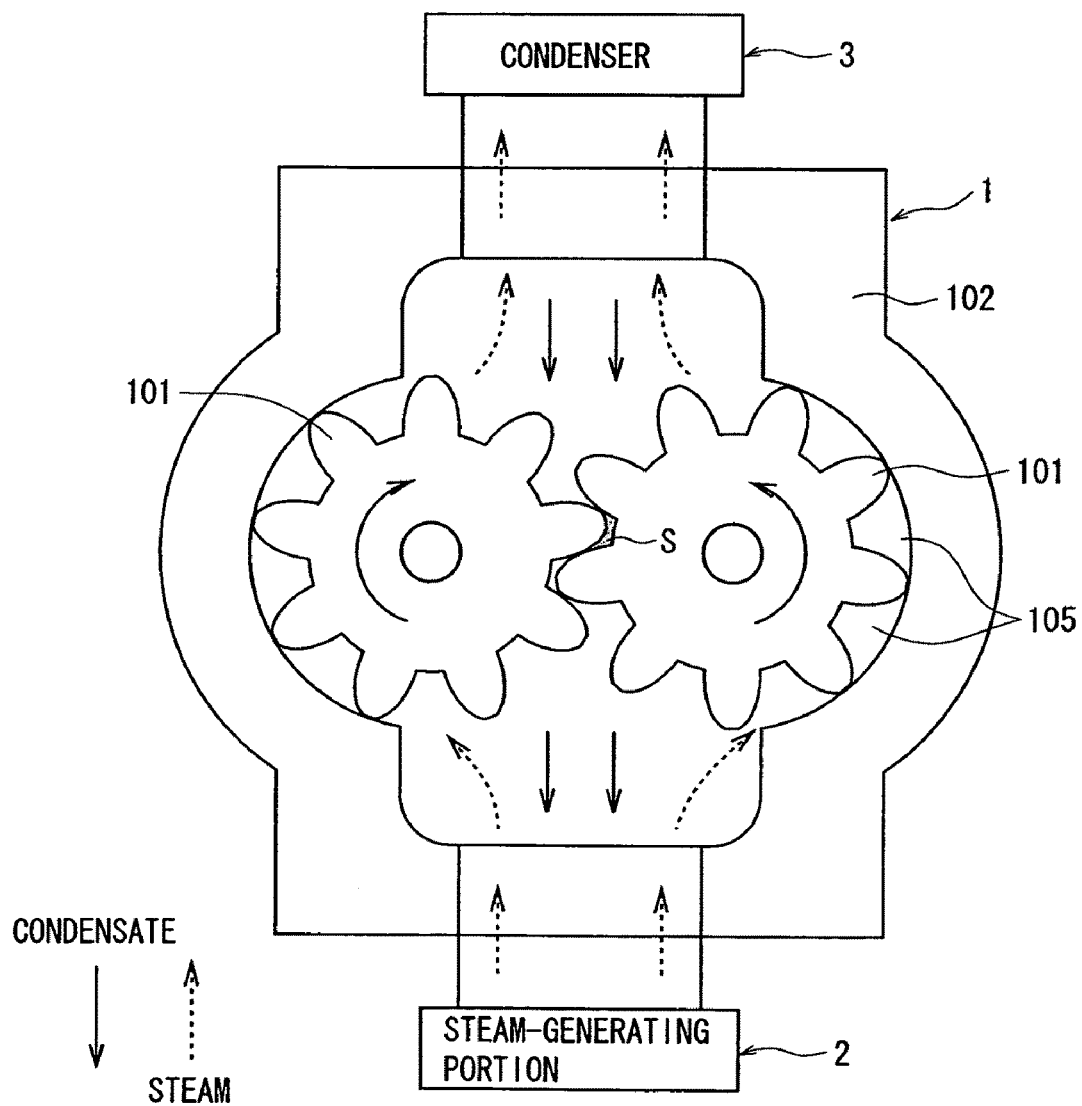
FIG. 4 is a view illustrating an another embodiment of the displacement engine in the steam engine of the present invention.

The above embodiment has used a vane-type machine as the displacement engine 1. It is, however, also allowable to use a gear-type machine as shown in FIG. 4. Like a gear pump, the gear-type machine has two gears 101 that rotate in mesh with each other, and a casing 102 for containing the gears 101. The steam generated in the steam-generating portion under the casing 102 fills the lower side of the gears 101, and enters into operation chambers 105 surrounded by the adjacent teeth of the gears 101 and the casing 102 as the gears 101 rotate. The operation chambers 105 formed on the outer sides of the gears 101 move upward with the rotation of the gears 101, and are opened on the side of the condenser of a low pressure near the uppermost portions thereof. The gears 101 rotate due to the torque based on a pressure differential between the high-pressure steam generated in the steam-generating portion and the low-pressure steam on the side of the condenser.

As the operation chambers 15 are opened on the side of the condenser, the steam therein is sent into the condenser where it is cooled to form the condensate. The condensate falls on the upper surfaces of the gears 101 due to gravity, and is refluxed into the steam-generating portion on the lower side via confined portions S formed by meshing portions of the two gears 101 as the teeth move downward. Like the displacement engine of FIG. 1, a generator is coupled to a rotary of one of the gears 101 to take out the electric power.

Figure 5:
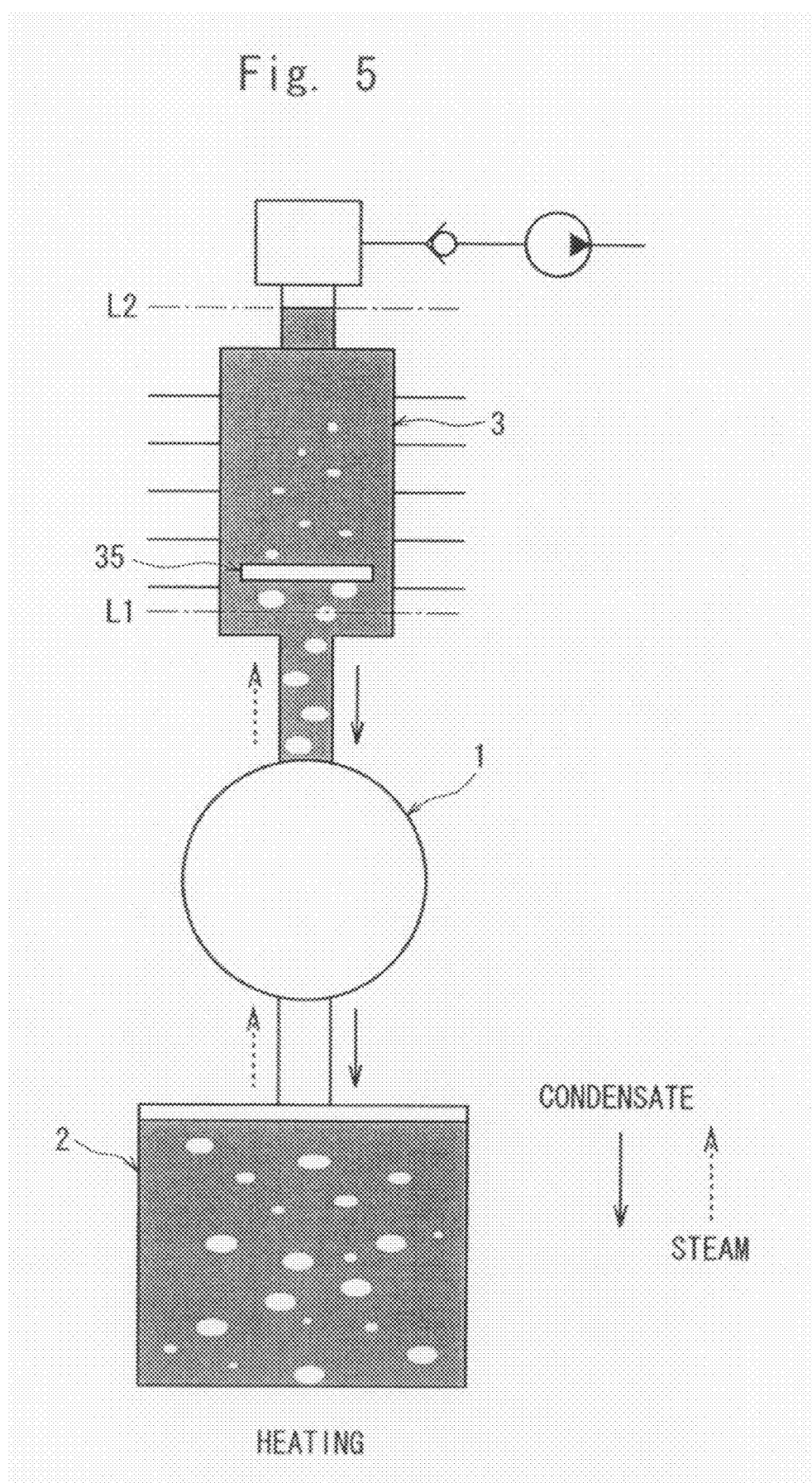
FIG. 5 is a view schematically illustrating an another operating state mode of the steam engine of the present invention.
Figure 6:
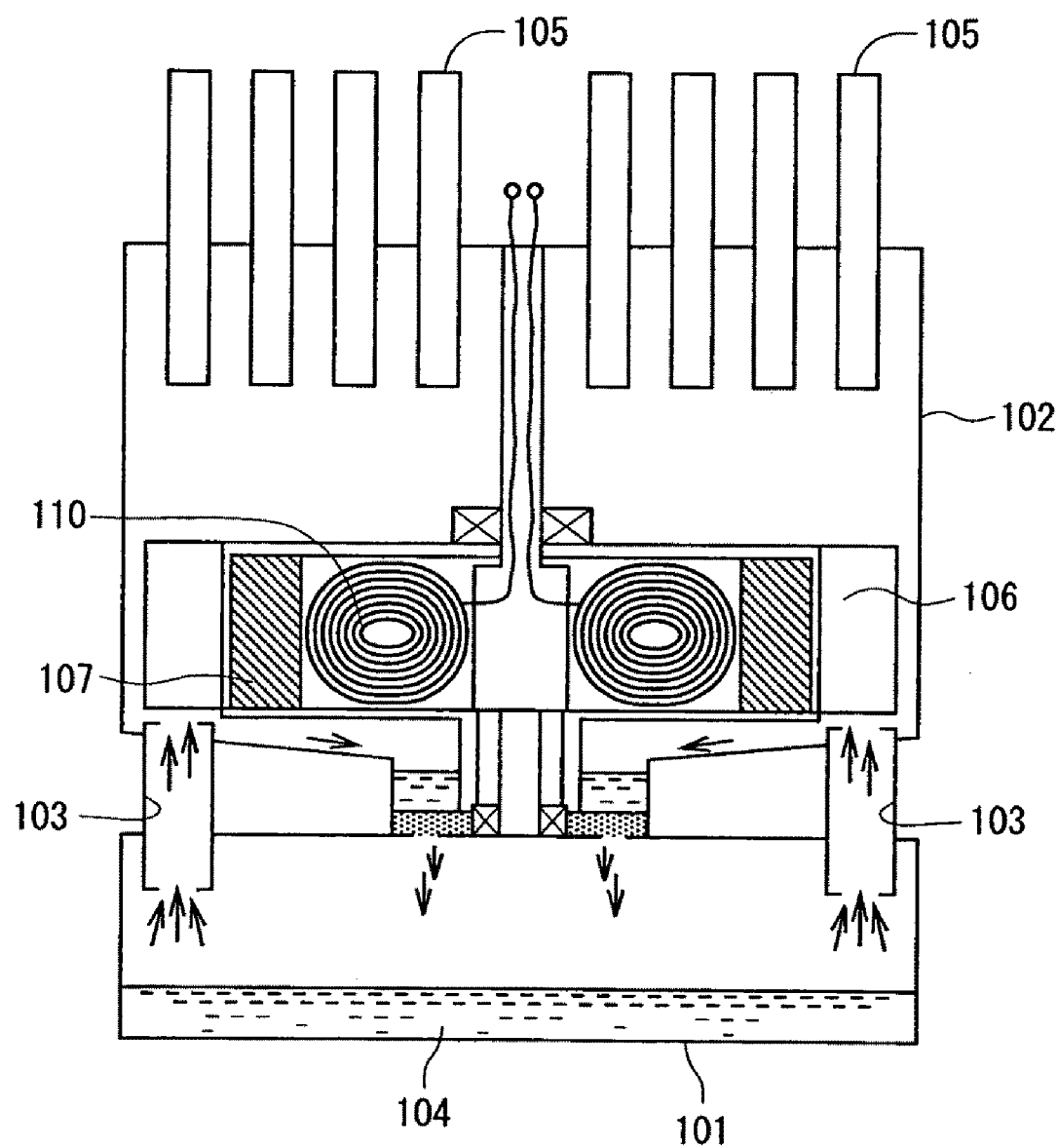
FIG. 6 is a view illustrating a conventional steam engine.

In the embodiment of FIG. 1, the level of water that is contained is just under the rotor 13 when the steam engine is not in operation. In the steam engine of the present invention, however, the level L1 of water when the engine is not in operation can be set in the condenser as schematically shown in FIG. 5. In this case, when the steam engine is normally operating, water is pushed up by the steam that is generated, the water level L2 reaches the upper part of the condenser, and the inside of the condenser is filled with the condensate. The steam released into the condenser from the displacement engine comes into direct contact with the condensate in the condenser and is condensed, featuring favorable heat conduction and enabling the condenser to be realized in a small size. Upon providing a wire gauze 35 or the like in the condenser, bubbles of the steam can be made more fine to further promote the conduction of heat.

INDUSTRIAL APPLICABILITY

As described above in detail, the steam engine of the present invention comprises a displacement engine having a rotor, a steam-generating portion arranged thereunder, a condenser arranged thereover, and wherein the operation fluid is transferred and refluxed through the displacement engine to rotate it. Therefore, the steam engine of the present invention can be used as a heat engine for converting the heat possessed by various kinds of heat sources into the power. Though the above embodiment has dealt with the case of converting the heat in a low-temperature state such as the exhaust heat of an internal combustion engine into the rotational energy, it needs not be pointed out that the steam engine of the present invention is capable of taking out the power by using a heat source of a high temperature based, for example, on the combustion or the like. As the liquid that serves as the operation fluid, further, it will be obvious that a coolant such as ammonia, alcohol or Freon can be used not being limited to water only.

The invention claimed is:

1. A steam engine, comprising:
a displacement engine having a rotor that rotates;
a steam-generating portion arranged under the displacement engine and being communicated with the displacement engine to generate steam by heating a liquid contained therein; and
a condenser arranged over the displacement engine and being communicated with the displacement engine to condense the steam of the liquid,
wherein the rotor is provided with a plurality of operation chambers, a volumetric capacity of the operation chambers increasing on a side that is moving upward with a rotation of the rotor, and decreasing on a side that is moving downward with the rotation of the rotor, and
wherein the steam of the liquid generated in the steam-generating portion is fed into the operation chambers on the side moving upward with the rotation of the rotor, and a liquid condensed by the condenser is fed into the operation chambers on the side moving downward with the rotation of the rotor and is refluxed into the steam-generating portion.

2. The steam engine according to claim 1, wherein a vacuum pump is connected to the condenser, and a pressure in the condenser is set to be a saturated steam pressure of the liquid.

3. The steam engine according to claim 1, wherein a level of the contained liquid is set in the condenser in a state where the steam engine is not in operation.

4. The steam engine according to claim 2, wherein a level of the contained liquid is set in the condenser in a state where the steam engine is not in operation.

5. The steam engine according to claim 1, wherein the volumetric capacity of the operation chambers increases in a lower side of a transverse center axis of the displacement engine and decreases on an upper side of the transverse center axis of the displacement engine.

6. The steam engine according to claim 1, wherein a magnitude of a rotational torque acting on the rotor is irrespective of a rotational speed of the rotor.

7. The steam engine according to claim 1, wherein a surface of the rotor comprises an elastic member for elastic deformation.

8. The steam engine according to claim 1, further comprising:
a vacuum pump connected through a pipe to a steam reservoir portion of the condenser.

9. The steam engine according to claim 8, wherein an end of the pipe is inserted in the steam reservoir portion of the condenser and another end of the pipe is connected to the vacuum pump, a check valve being placed through the pipe between the steam reservoir portion of the condenser and the vacuum pump.

* * * * *